United States Patent
Rogers

(10) Patent No.: US 9,299,058 B2
(45) Date of Patent: Mar. 29, 2016

(54) METHOD AND APPARATUS FOR AUTOMATED DISPLAY OF DOCUMENTATION

(75) Inventor: Ben Jeffrey Rogers, Fairbanks, AK (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 237 days.

(21) Appl. No.: 13/486,539

(22) Filed: Jun. 1, 2012

(65) Prior Publication Data

US 2013/0325886 A1 Dec. 5, 2013

(51) Int. Cl.
*G06F 17/30* (2006.01)
*G06Q 10/10* (2012.01)

(52) U.S. Cl.
CPC .......... *G06Q 10/10* (2013.01); *G06F 17/30244* (2013.01)

(58) Field of Classification Search
None
See application file for complete search history.

(56) References Cited

U.S. PATENT DOCUMENTS

| | | | |
|---|---|---|---|
| 2003/0110253 A1* | 6/2003 | Anuszczyk et al. | 709/224 |
| 2003/0152277 A1* | 8/2003 | Hall et al. | 382/229 |
| 2006/0161895 A1* | 7/2006 | Speeter et al. | 717/121 |
| 2007/0073735 A1* | 3/2007 | Clarke | 707/100 |
| 2007/0239628 A1* | 10/2007 | Peck et al. | 706/11 |
| 2011/0106810 A1* | 5/2011 | Huck et al. | 707/741 |
| 2011/0271177 A1* | 11/2011 | Bastos Dos Santos et al. | 715/256 |
| 2013/0041874 A1* | 2/2013 | Dohm et al. | 707/705 |

OTHER PUBLICATIONS

Esposito, Dino; Windows 2000 Registry: Latest Features and APIs Provide the Power to Customize and Extend Your Apps; Nov. 2000.*
D. Craig, "Asp.net C# Search Engine (Highlighting JSON jQuery & Silverlight)", downloaded from: http://www.codeproject.com/Articles/33903/ASP-NET-C-Search-Engine; published Mar. 5, 2009, 12 pages.
Tran Nam Quang, "DocFetcher" downloaded from: http://docfetcher.sourceforge.net/en/index.html published 2009, 3 pages.
Google, "Highlight and find words on websites", downloaded on Feb. 4, 2013 from: http://support.google.com/toolbar/bin/answer.py?hl=en&answer=9273, 1 page.
Tereza Iofciu, NIck Craswell and Milad Shokouhi, "Evaluating the Impact of Snippet Highlighting in Search" Copyright is held by the author/owner(s). SIGIR'09, Jul. 19-23, 2009, 4 pages.

* cited by examiner

*Primary Examiner* — Aleksandr Kerzhner
*Assistant Examiner* — Michael K Tamaru
(74) *Attorney, Agent, or Firm* — Keller Jolley Preece

(57) ABSTRACT

A method and apparatus for automated display of documentation is disclosed. The method comprises identifying a selected item in a user interface, performing a pattern match of the identified item against a documentation database, and displaying documentation for the identified item found in the documentation database based on the pattern match.

14 Claims, 4 Drawing Sheets

200

+-----REGISTRYKEY CLASS ~202
|-----REGISTRYKEY METHODS
|-----CLOSE
|-----CREATESUBKEY
|-----DELETESUBKEY
|-----DELETESUBKEYTREE
|-----DELETEVALUE
|-----DISPOSE ~204
|-----FLUSH
|-----FROMHANDLE
|-----GETACCESSCONTROL
|-----GETSUBKEYNAMES
|-----GETVALUE
|-----GETVALUEKIND
|-----GETVALUENAMES
|-----MEMBERWISECLONE
|-----OPENBASEKEY
|-----OPENREMOTEBASEKEY
|-----OPENSUBKEY
|-----SETACCESSCONTROL
|-----SETVALUE
|-----TOSTRING

206 — "WRITES ALL THE ATTRIBUTES OF THE SPECIFIED OPEN REGISTRY KEY INTO THE REGISTRY. IT IS NOT NECESSARY TO CALL FLUSH TO WRITE OUT CHANGES TO A KEY. REGISTRY CHANGES ARE FLUSHED TO DISK WHEN THE REGISTRY USES ITS LAZY FLUSHER. 'LAZY FLUSHING OCCURS AUTOMATICALLY AND REGULARLY AFTER A SYSTEM-SPECIFIED TIME INTERVAL. REGISTRY CHANGES ARE ALSO FLUSHED TO DISK AT SYSTEM SHUTDOWN. UNLIKE CLOSE, THE FLUSH FUNCTION RETURNS ONLY WHEN ALL THE DATA HAS BEEN WRITTEN TO THE REGISTRY. THE FLUSH FUNCTION MIGHT ALSO WRITE OUT PARTS OF OR ALL OF THE OTHER KEYS. CALLING THIS FUNCTION EXCESSIVELY CAN HAVE A NEGATIVE EFFECT ON AN APPLICATION'S PERFORMANCE."

FIG. 2

METHOD AND APPARATUS FOR AUTOMATED DISPLAY OF DOCUMENTATION

BACKGROUND OF THE INVENTION

1. Field of the Invention

Embodiments of the present invention generally relate to displaying documentation in software products, and more particularly, to a method and apparatus for automated display of documentation.

2. Description of the Related Art

Various techniques are used to provide information to a computer user. Pop-ups such as "tooltips" are a common means of providing information about user selectable items in a user interface. Many software applications typically provide documentation, such as tooltips to assist the user with understanding and operation of the provided software application. For example, when a user hovers a mouse pointer over items in a toolbar or when the user clicks on a help button, information is presented on the screen. The information that is presented must be hard coded into the software application before the application is compiled (if applicable) or released. The user interface is pre-programmed so the information for that application may be retrieved and presented automatically.

However, operating system level components typically have no documentation that can be directly accessed. ADOBE® Acrobat®, for example, has over 1000 registry key (Windows) and plist (Mac) preferences. The Windows Registry, for example, is a hierarchical system of storage, i.e., a database that holds configurations and settings information (hereinafter referred to as "preferences") for an operating system. Hardware, software, applications and user preference settings are all saved and stored by the Windows Registry. A similar mechanism is employed by Macintosh in the form of plist files. All of the registry keys and plist preferences control how a software application works for a particular user or computer. At an enterprise level, these preferences are set by a system administrator or an information technology (IT) specialist before a software application is deployed across their organizations. Currently, documentation files for operating system level components are not native or packaged with the registry. Therefore, a system administrator or IT specialist needs to access online documentation and/or download relevant documentation from available sources. Then the system administrator or IT specialist must look up the preference options for a component, exit from the documentation, return to the operating system level to set preferences and go back and forth for each of the many registry key or plist preferences. As a result, existing conventional techniques are unable to offer simple and automated solutions for presenting exact documentation (or preference options) for an operating system level component selected by the user.

Therefore, there is a need for a method and apparatus for automated display of documentation.

SUMMARY OF THE INVENTION

Embodiments of the present invention provide a method and apparatus for automated display of documentation. In one embodiment, the method comprises identifying a selected item in a user interface. The method performs a pattern match of the identified item against a documentation database and displays documentation for the identified item found in the documentation database based on the pattern match.

BRIEF DESCRIPTION OF THE DRAWINGS

FIG. 2 depicts a schematic illustrating the automated display of documentation, as performed by the system of FIG. 1, according to one or more embodiments of the invention;

Figure 1:
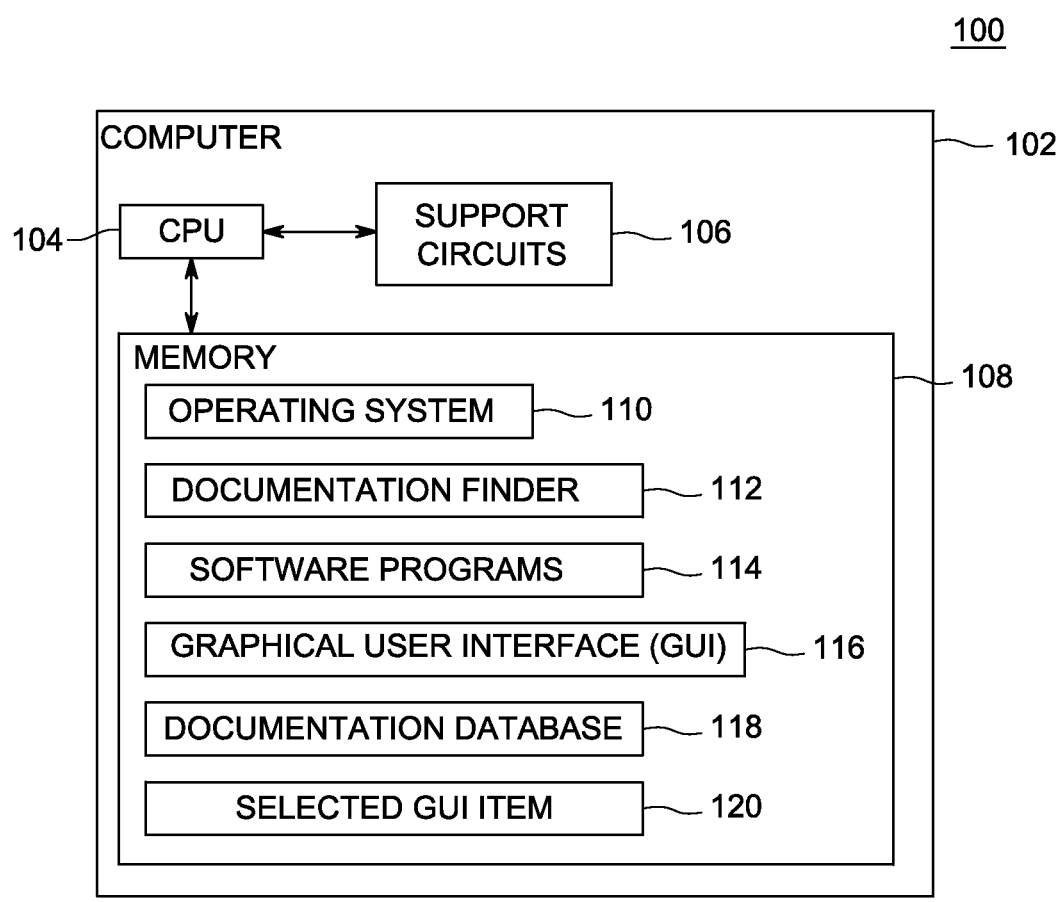
FIG. 1 depicts a system for automated display of documentation, according to one or more embodiments of the invention.

While the method and apparatus is described herein by way of example for several embodiments and illustrative drawings, those skilled in the art will recognize that the method and apparatus for automated display of documentation are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automated display of documentation as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for automated display of documentation. The embodiments offer simple and automatic presentation of information and preference options for any documented component based on a user selection. In some embodiments, the documentation may be created by a software or operating system provider. In other embodiments, a third party may provide operating system level documentation when the operating system provider provides no mechanism for doing so. When a user selects, highlights, or otherwise interacts with a user interface item such as a preference, the method stores the interface item. The method determines whether a match exists for the stored interface item in the documentation file. If a match is found, the documentation for the item is displayed using any display method (e.g. tooltip, html page, and the like). Advantageously, embodiments provide simple and automatic presentation of the exact documentation based on a user selection. Further, the embodiments may be easily implemented using a tooltips, HTML pop up or any other suitable means.

Various embodiments of an apparatus and method for automated display of third party documentation are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a system 100 for automated display of third party documentation, according to one or more embodiments of the invention. The system 100 includes a computer 102 for automating third party documentation, The computer 102 comprises a CPU 104, support circuits 106, and a memory 108. The computer 102 is a type of computing device (e.g., a laptop, a desktop, a Personal Digital Assistant (PDA) and/or the like) known to one of ordinary skill in the art. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 108 comprises at least one of Read Only Memory (ROM), Random Access Memory (RAM), disk drive storage, optical storage, removable storage and/or the like. The memory 108 comprises an operating system 110, a documentation finder 112, software programs 114, a graphical user interface (GUI) 116, a documentation database 118 and a selected user interface item 120.

According to some embodiments of the invention, the operating system (OS) 110 generally manages various computer resources (e.g., network resources, file processors, and/or the like). The operating system 110 is configured to execute operations on one or more hardware and/or software modules, such as Network Interface Cards (NICs), hard disks, virtualization layers, firewalls, software programs, documentation finder and/or the like. Examples of the operating system 110 may include, but are not limited to, Linux, Mac OSX, BSD, UNIX, Microsoft Windows, and the like. When software programs 114 are installed on the computer 102, preferences are saved in the registry key or plist database and control how the software programs 114 perform on the computer 102 and perform with other software programs 114.

According to some embodiments, the documentation database 118 includes documentation associated with registry keys or plists that can be displayed on the graphical user interface (GUI) 116. In some embodiments, the documentation database 118 may be an Extensible Markup Language (XML) file or simply a text file. In some embodiments the documentation database 118 may be provided by a third party documentation provider (that is, someone other than the vendor of the software program 114) or in other embodiments it may be provided by the vendor of the software program 114.

According to some embodiments, a user selects, highlights or interacts in some way with a GUI item 120 in the GUI 116. The documentation finder 112 identifies an item in the graphical user interface (GUI) 116. According to some embodiments, the GUI item 120 is an operating system level component and the GUI item 120 is at least one of an image (a set of pixels) or a text string. In some embodiments, the document finder 112 stores the GUI item 120 as an image. In some embodiments, the documentation finder 112 stores the GUI item as a text string. The documentation finder 112 stores the selected GUI item 120. As a user navigates around the GUI 120, for example with a mouse, the mouse cursor interacts with a plurality of GUI items 120. The user interactions are tracked and the last of these GUI items 120 is stored by the documentation finder 112. When a user hovers over or selects a specific GUI item 120, the documentation finder 112 looks up the GUI item 120 and looks for a match to that GUI item 120 in the documentation database 118. The documentation finder 112 performs a pattern match of the stored GUI item 120 against the items contained in the documentation database 118. If a match is found in the documentation database 118, the documentation entry found in the documentation database 118 corresponding to that item 120 is displayed.

FIG. 2 depicts a schematic 200 illustrating the automated display of documentation, as performed by the system of FIG. 1, according to one or more embodiments. A portion of a Windows registry 202 is displayed. The user may click on, highlight, hover with the mouse pointer over or otherwise interacts with the registry key item "Flush" 204. In one embodiment, the documentation finder identifies the text string, "Flush" 204 and looks for a pattern match for that text string. In another embodiment, the documentation finder stores "Flush" 204 as a set of pixels, or an image and looks for a pattern match for that set of pixels or image. Thus, the documentation finder performs a pattern match of the item 204 against the documentation database. If a match is found, thereby indicating relevant documentation, the relevant documentation in the documentation database is displayed to the user. For example, assuming the item "Flush" is found in the documentation database, the documentation entry found in the documentation database corresponding to "Flush" is displayed 206 as, for example:

"Writes all the attributes of the specified open registry key into the registry. It is not necessary to call Flush to write out changes to a key. Registry changes are flushed to disk when the registry uses its lazy flusher. Lazy flushing occurs automatically and regularly after a system-specified time interval. Registry changes are also flushed to disk at system shutdown. Unlike Close, the Flush function returns only when all the data has been written to the registry. The Flush function might also write out parts of or all of the other keys. Calling this function excessively can have a negative effect on an application's performance."

The documentation may be displayed using any display method (e.g. tooltip, html page, and the like). Thus, the system administrator or IT specialist is automatically provided with information needed to set the preferences for the "Flush" key without having to look elsewhere for documentation.

Figure 3:
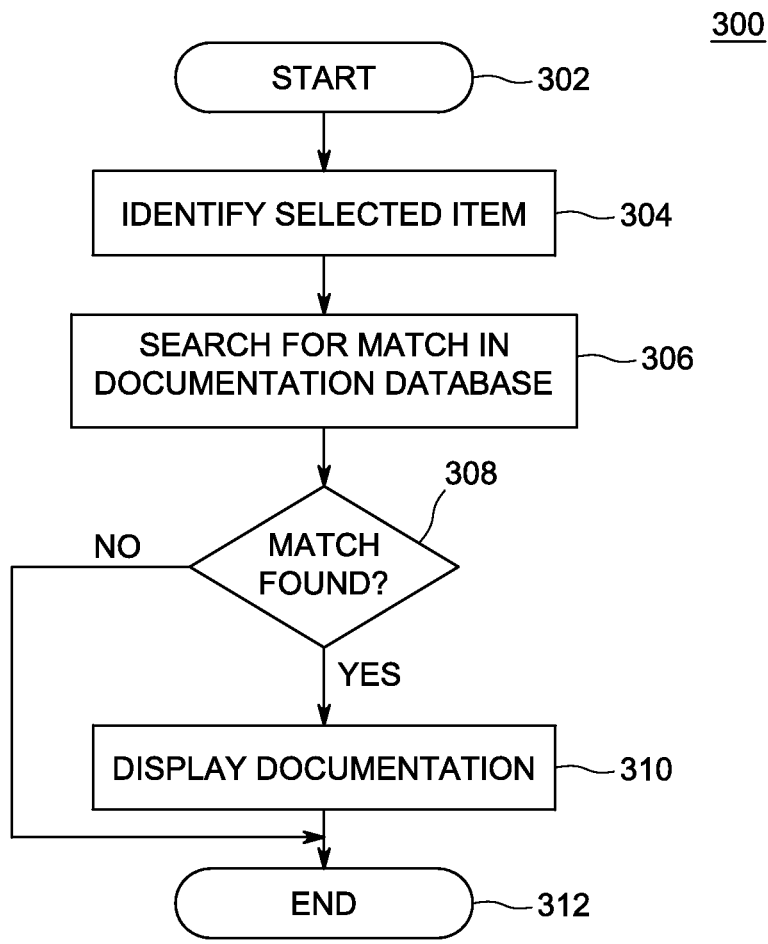
FIG. 3 depicts a flow diagram of a method for automated display of documentation as performed by the documentation finder of FIG. 1, according to one or more embodiments of the invention.

FIG. 3 depicts a flow diagram of a method 300 for automated display of documentation, as performed by the documentation finder 112 of FIG. 1, according to an embodiment of the invention.

The method 300 starts at step 302, and proceeds to step 304. At step 304, the method 300 identifies a selected GUI item. In some embodiments, when a user highlights, clicks on or otherwise interacts with an item on a graphical user interface (GUI), the document finder stores the GUI item. In one embodiment, the GUI item is stored as a text string. In another embodiment, the GUI item is stored as an image (or a set of pixels). The method 300 proceeds to step 306. At step 306, the method 300 retrieves the stored GUI item and searches for a match in the documentation database. In some embodiments, the documentation finder looks up the string or looks for a match of the image to items in the documentation database. The documentation database may be provided by a third party documentation provider or by the vendor of the operating system or other software vendor. The documentation database may be stored in or out of memory. The method 300 proceeds to step 308.

At step 308, the method 300 determines whether a match was found in the documentation database. If a match was not found, the method 300 proceeds to step 312 and ends. If at step 308, the method 300 determines that a match was found, the method 300 proceeds to step 310. At step 310, the method 300 displays the information found in the documentation database. The information displayed may comprise text describing the GUI item or the information may be a Universal Resource Locator (URL) link, which may be selected to retrieve more information. The method 300 proceeds to step 312 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the C programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
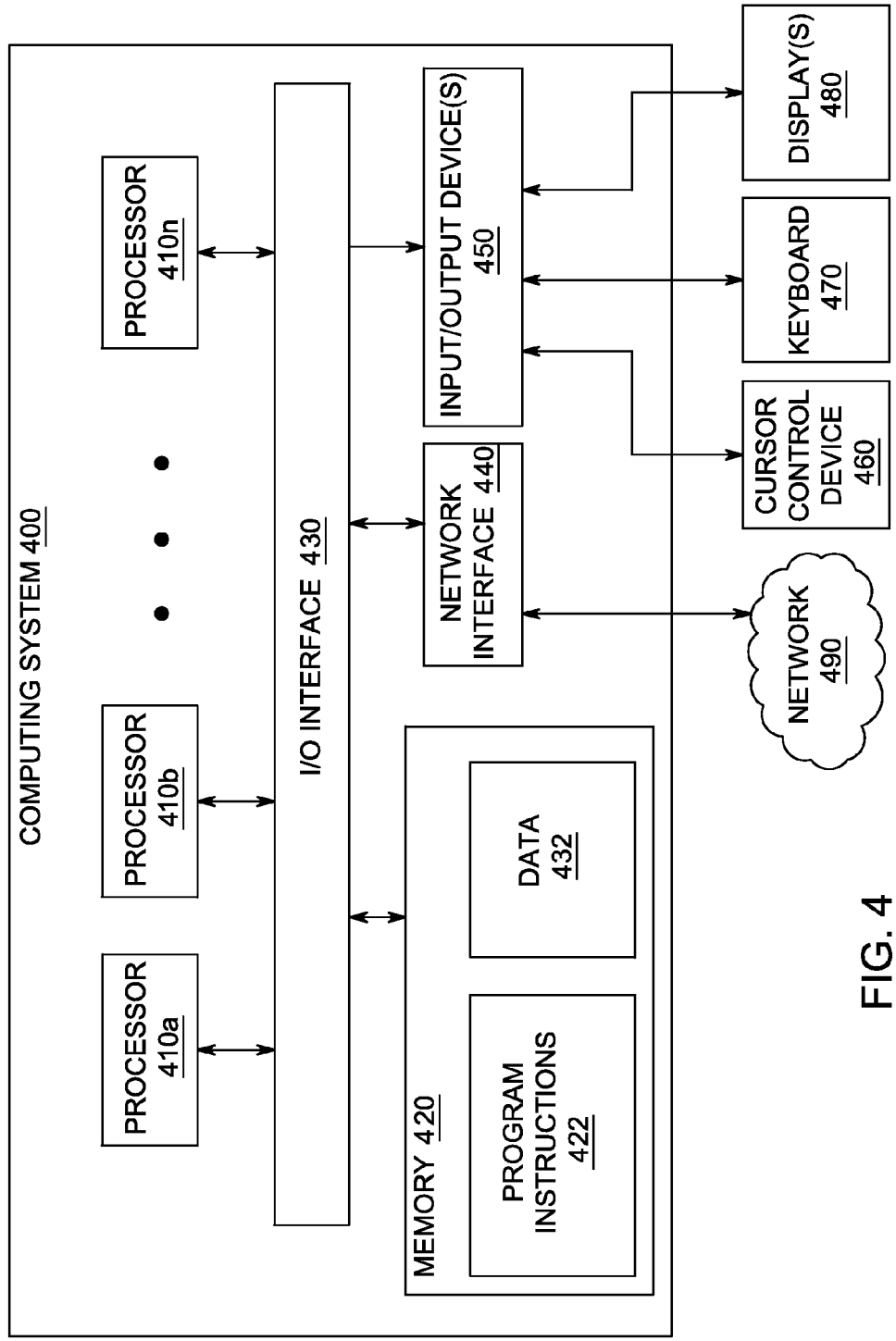
FIG. 4 depicts a computer system that can be utilized in various embodiments of the present invention, according to one or more embodiments of the invention.

FIG. 4 depicts a computer system that can be used to implement the method of FIG. 3 in various embodiments of the present invention, according to one or more embodiments of the invention. FIG. 4 depicts a computer system that can be utilized in various embodiments of the present invention to implement the computer 102, according to one or more embodiments.

Various embodiments of method and apparatus for automated display of third party documentation, as described herein, may be executed on one or more computer systems, which may interact with various other devices. One such computer system is a computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450, In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touch pads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for automated display of documentation, comprising:
 detecting, by at least one processor, a display of a user interface of a computer program, wherein the user interface comprises a plurality of user interface items;
 receiving a user selection of a user interface item of the plurality of user interface items;
 capturing, based on receiving the user selection of the user interface item, an image that comprises a set of pixels from the user interface corresponding to the user interface item, wherein the image comprises a text string;
 accessing a documentation database provided by a third-party documentation provider that is unaffiliated with a provider of the computer program, wherein the documentation database comprises a plurality of image items associated with at least one documentation entry;
 identifying an image item of the plurality of image items within the documentation database that matches the captured image; and
 initiating display of a documentation entry associated with the identified image item, wherein the documentation entry comprises a description of a configuration setting corresponding to the user interface item and any available configuration options associated with the configuration setting.

2. The method of claim 1, further comprising providing the captured image to the documentation database using a native Application Program Interface (API).

3. The method of claim 1, wherein identifying the image item that matches the captured image comprises comparing the captured image to the plurality of image items.

4. The method of claim 1, wherein the documentation database further comprises preference documentation entries for a registry of a computer operating system.

5. The method of claim 1, wherein capturing the image that comprises a set of pixels from the user interface corresponding to the user interface item is performed by a third-party application that is unaffiliated with the computer program.

6. The method of claim 1, further comprising executing a third-party documentation application that is unaffiliated with the computer program, wherein the third-party documentation application coordinates the method for automated display of documentation related to the computer program.

7. A non-transitory computer readable medium for storing computer instructions that, when executed by at least one processor cause the at least one processor to perform a method for automated display of documentation, the method comprising:
 detecting, by the at least one processor, a display of a user interface of a computer program, wherein the user interface comprises a plurality of user interface items;
 receiving a user selection of a user interface item of the plurality of user interface items;
 capturing, based on receiving the user selection of the user interface item, an image that comprises a set of pixels from the user interface corresponding to the user interface item, wherein the image comprises a text string;
 accessing a documentation database provided by a third-party documentation provider that is unaffiliated with a provider of the computer program, wherein the documentation database comprises a plurality of image items associated with at least one documentation entry;
 identifying an image item of the plurality of image items with the documentation database that matches the captured image; and
 initiating display of a documentation entry associated with the identified image item, wherein the documentation entry comprises a description of a configuration setting corresponding to the user interface item and any available configuration options associated with the configuration setting.

8. The computer readable medium of claim 7, wherein identifying the image item comprises comparing the set of pixels to a plurality of sets of pixels associated with documentation entries in the documentation database.

9. The computer readable medium of claim 7, wherein initiating display of the documentation entry associated with the identified image item further comprises displaying a link to a location containing more documentation.

10. The computer readable medium of claim 7, wherein the documentation database further comprises preference documentation entries for a registry of a computer operating system.

11. A system for automated display of third-party documentation related to a computer program, comprising:
 at least one processor; and
 at least one non-transitory computer readable storage medium storing instructions thereon that, when executed by the at least one processor, cause the system to:
  initiate a third-party documentation application and a computer program;

detect, by the third-party documentation application, a display of a user interface of the computer program, wherein the user interface comprises a plurality of user interface items;

receive, at the third-party documentation application, an indication of a user selection of a user interface item of the plurality of user interface items;

capture, by the third-party program and based on receiving the indication of the user selection of the user interface item, an image that comprises a set of pixels from the user interface corresponding to the user interface item, wherein the image comprises a text string;

access, by the third-party program, a documentation database that is unaffiliated with a provider of the computer program, wherein the documentation database comprises a plurality of image items associated with at least one documentation entry;

identify an image item of the plurality of image items within the documentation database that matches the captured image; and provide, by the third-party program, a documentation entry associated with the identified image item, wherein the documentation entry comprises a description of a configuration setting corresponding to the user interface item and any available configuration options associated with the configuration setting.

12. The system of claim 11, further comprising instructions, that when executed by the at least one processor, causes the system to provide the captured image to the documentation database using an Application Program Interface (API).

13. The system of claim 11, wherein the documentation database further comprises preference documentation entries for a registry of a computer operating system.

14. The system of claim 11, wherein initiating display of the documentation entry associated with the identified image item further comprises displaying a link to a location containing more documentation.

* * * * *